Feb. 18, 1947.    M. P. MATUSZAK    2,416,013
PROCESS FOR THE ALKYLATION OF HYDROCARBONS
Filed May 12, 1945
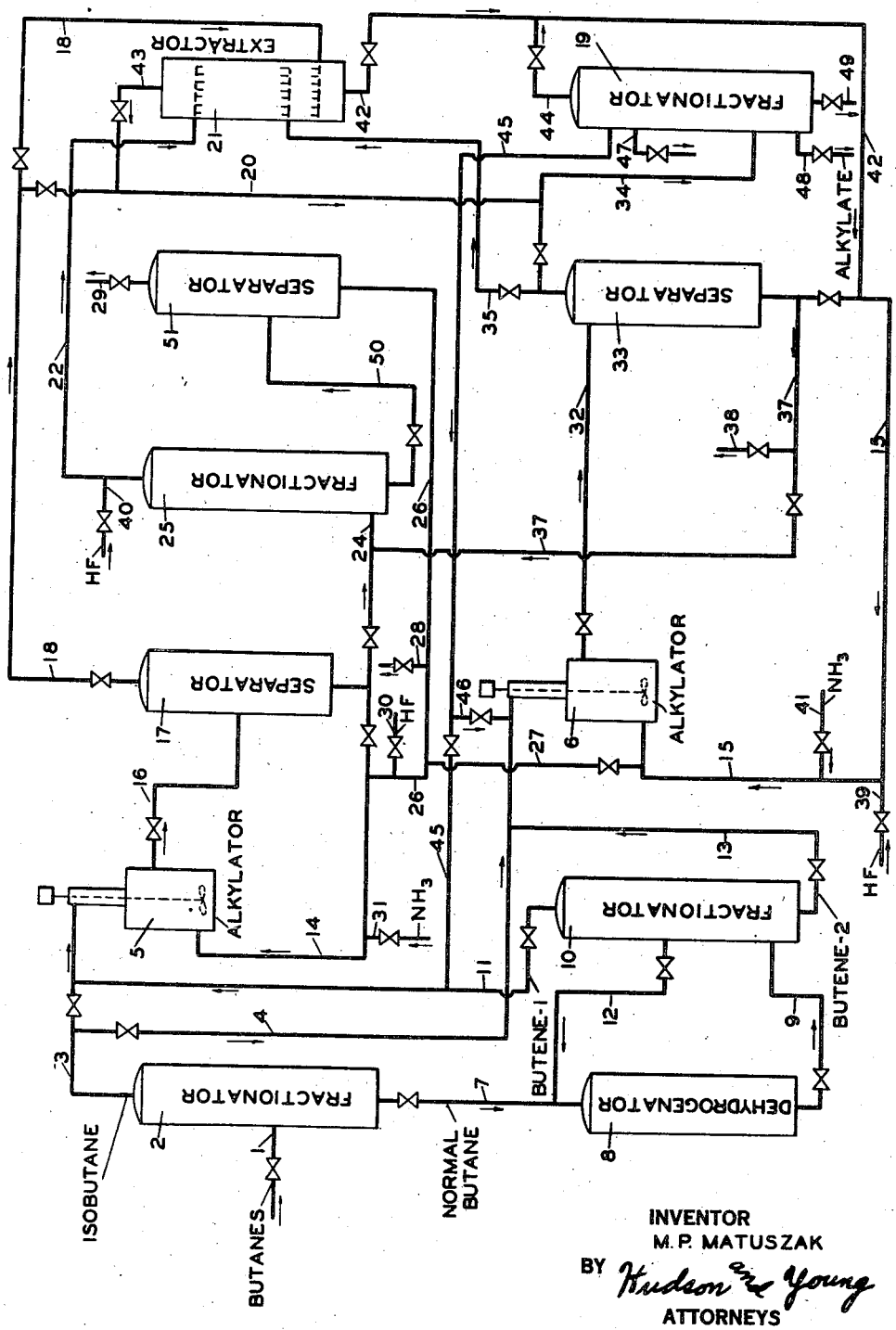
INVENTOR
M. P. MATUSZAK
BY Hudson & Young
ATTORNEYS Patented Feb. 18, 1947

2,416,013

UNITED STATES PATENT OFFICE 2,416,013

PROCESS FOR THE ALKYLATION OF HYDROCARBONS

Maryan P. Matuszak, Bartlesville, Okla., assignor to Phillips Petroleum Company, a corporation of Delaware Application May 12, 1945, Serial No. 593,462

18 Claims. (Cl. 260—683.4)

This invention relates to an improved process for the conversion of hydrocarbons. In a particular aspect this invention relates to the alkylation of low-boiling isoparaffin hydrocarbons in the presence of a hydrogen fluoride-containing catalyst by reaction with low-boiling olefins. In this particular aspect this invention relates to a novel process for the alkylation of isobutane with an olefinic mixture comprising butene-1 and butene-2 in the presence of hydrofluoric acid to produce an alkylate of high quality.

This invention is a continuation-in-part of my copending application, Serial No. 550,447, filed August 21, 1944, which in turn is a continuation-in-part, insofar as any common subject matter is concerned, of my copending applications, Serial Nos. 467,872 (now Patent No. 2,399,368, issued April 30, 1946), 467,873, and 467,874 (now Patent No. 2,387,162, issued October 16, 1945), all of which were filed on December 4, 1942; the last-mentioned application is a continuation-in-part of application Serial No. 395,282, filed May 26, 1941, now Patent No. 2,320,629, issued June 1, 1943. This invention is an improvement of the alkylation process described in the copending application of Frederick E. Frey, Serial No. 545,309, filed July 17, 1944, which is a continuation-in-part of Serial No. 450,588, filed July 11, 1942, now Patent No. 2,384,294, issued September 4, 1945, in which process the hydrofluoric acid catalyst is modified or tempered by the presence of a soluble compound containing a nitrogen atom basic to hydrofluoric acid.

In a typical method of conducting an alkylation reaction, an alkylatable hydrocarbon is agitated with hydrofluoric acid to produce a liquid mixture or emulsion which is maintained at a reaction temperature suitable for alkylation, and an alkylating reactant, such as normal butene, is introduced in such a way as to maintain a very low concentration of alkylating reactant in the mixture. After a suitable reaction time the hydrocarbon layer may be decanted, and the juncture product or alkylate may be separated from other hydrocarbons, as by fractional distillation. When using hydrogen fluoride as the catalyst, the alkylation reaction may be effected at a temperature between about 30° F. to about 200° F., and preferably at a pressure sufficient to maintain the reactants in the liquid phase. A mole ratio of paraffin to olefin of about 2:1 to about 15:1 is suitable as the composition of the feed in effecting the reaction; however, the ratio of paraffin to olefin in the reaction zone itself is much greater, preferably 100:1 or more. About 0.5:1 to about 4:1 volume ratio of hydrogen fluoride to hydrocarbon is the preferable concentration for catalyzing the alkylation reaction. The appropriate reaction time in the reaction zone may vary from about one to about thirty minutes.

The alkylating reactant which is contacted with the alkylatable hydrocarbon in the reaction zone is obtained from conventional refinery sources and usually comprises a mixture of 1-olefins and 2-olefins. Since it is known that 1-olefins react with the alkylatable hydrocarbon, such as isobutane, to form an alkylate having an octane number relatively lower that than for an alkylate produced by reacting with 2-olefins, it has been found particularly desirable in some cases to limit the alkylating reactant composition to 2-olefins, such as butene-2, etc. For example, the alkylation of isobutane with butene-1 in the presence of hydrogen fluoride produces an alkylate which has an octane number of about 89; while alkylation of isobutane with butene-2 produces an alkylate which has an octane number of about 92.

As indicated in my aforementioned copending application, Serial No. 467,873, an alkylating reactant which may comprise a 1-olefin or a mixture of a 1-olefin and a 2-olefin is isomerized to convert the 1-olefin to the 2-olefin, and subsequently the isomerized alkylating reactant is used to alkylate an alkylatable hydrocarbon to form a product which has a higher octane number than would normally be realized without isomerizing the 1-olefin to the 2-olefin.

As an alternative method of obtaining an alkylate of high octane quality without the aforementioned isomerization of 1-olefins in the alkylating reactant, the present invention provides a unitary, integrated process for alkylating isoparaffins with both 1-olefins and 2-olefins in the presence of a hydrofluoric acid alkylation catalyst, each type of olefin being used to alkylate the isoparaffin under conditions peculiarly adapted to obtaining an alkylate of optimum yield and octane quality. The process of the present invention is especially adaptable to alkylation of isobutane with a normal olefinic mixture comprising butene-1 and butene-2 in the presence of hydrogen fluoride. The high quality alkylate of the present process is obtained with the use of a minimum of equipment and with less expenditure of time, effort and materials than is required by a process characterized by separate isomerization of 1-olefins to 2-olefins, followed by a hydrofluoric acid alkylation of the alkylatable hydrocarbon with an isomerized olefin.

Among the objects of this invention is to provide an improved process for the conversion of hydrocarbons.

Another object is to alkylate low-boiling isoparaffins to suitable motor-fuel hydrocarbons.

An object of this invention is to shorten the reaction time in the alkylation of low-boiling isoparaffins with olefins in the presence of hydrogen fluoride.

Still another object is to provide an improved process for alkylating isobutane with normal butene, whereby the alkylate obtained has an octane rating higher than that of the alkylate obtained under comparable conditions by conventional hydrofluoric acid alkylation.

A further object is to increase the yield of light alkylate in the alkylation of low-boiling isoparaffins in the presence of hydrogen fluoride.

Still a further object is to provide a process for the alkylation of low-boiling isoparaffins with an olefinic mixture comprising butene-1 and butene-2 in the presence of hydrogen fluoride as the alkylation catalyst.

Other objects and advantages will become apparent from the accompanying description and disclosure.

Much to my surprise, I have found that, in an alkylation process catalyzed in particular by a hydrofluoric acid-containing catalyst, certain compounds may be advantageously added to the acid, to the reaction mixture or to the reactants in an appropriate amount, hereinafter described, to promote the formation of an alkylate of superior quality. Further, I have found that these compounds can be recovered and recycled to the process.

Compounds which may be used to promote the alkylation of isoparaffins and normal olefins in the presence of hydrogen fluoride comprise basic nitrogen compounds such as ammonia, ammonium, amino, amido, imino, imido compounds, and nitrogen bases, such as quinoline and pyridine and their homologues. The class of organic compounds is further exemplified by acid amides, such as acetamide, aliphatic amines, such as methyl amine, dimethyl amine, trimethyl amine, the butyl amines, and ethylene diamine, and other aliphatic and cyclic nitrogen compounds including organic bases, such as aniline, naphthylamines, toluidine, hexamethylene tetramine, piperidine, toluylene diamine, and hydrazine, etc. Inorganic ammonium compounds, such as ammonium fluoride, ammonium bifluoride and the like, may be used also with satisfactory results. It has been found that such basic nitrogen compounds are not particularly beneficial, although not detrimental, when an isoparaffin is alkylated with an isoolefin, such as isobutene, in the presence of hydrogen fluoride. For this reason, the basic nitrogen compounds are used as promoters according to this invention preferably only when a substantial amount of a normal olefin comprises the alkylating reactant.

In accordance with one aspect of this invention, I have found that the formation of alkylate hydrocarbons of especially high octane number is promoted by the presence of a minor or limited proportion of a basic nitrogen compound, such as ammonia, quinoline, etc., in the hydrofluoric acid. In the case of using ammonia, the ammonia may be introduced as such or as an ammonium salt, preferably an ammonium fluoride and most preferably ammonium bifluoride. The proportion of ammonia or other basic nitrogen compound should be between approximately 1 and approximately 10 mole per cent of the total hydrogen fluoride, considered as the monomer, exclusive of any dissolved matter, when normal butene is the alkylating olefin. The optimum proportion for any particular set of selected alkylation conditions may be readily determined by trial; usually the optimum proportion in alkylating isobutane with butene-1 is between about 4.5 and about 6.5 mole per cent, so that the proportion is preferably adjusted to approximately 5.5 mole per cent. This proportion is rather critical from the point of view of obtaining an alkylate of the highest possible octane rating. If too little ammonia is present, the alkylation degenerates into the conventional hydrofluoric acid-catalyzed alkylation; if too much is present, the olefin is consumed in formation of the corresponding alkyl fluoride, accompanied by considerable polymerization, and the resulting product is inferior in both yield and octane rating and contains an excessive proportion of organic fluorine compounds. Furthermore, the critical limits of the proportion of ammonia in hydrofluoric acid alkylation with butene-2 appear to differ somewhat from those for butene-1, under otherwise substantially identical alkylation conditions. That is, in alkylation of isobutane with butene-2, the optimum proportion of ammonia appears to be between about 2.5 and about 4.5 mole per cent of the hydrogen fluoride in the catalyst, so that the proportion is preferably maintained at approximately 3.5 mole per cent. For alkylating an isoparaffin with a mixture of normal butenes, the preferred proportion of ammonia should be adjusted in accordance with the proportions of the butene-1 and butene-2 in the mixture; for example, for a mixture containing approximately equal proportions of butene-1 and of butene-2, the preferred proportion of ammonia is approximately 4.5 mole per cent of the hydrogen fluoride in the catalyst. In alkylating with solely isobutene, however, no ammonia preferably should be present in the catalyst; hence, when the alkylation is being made with a mixture containing isobutene and one or both normal butenes, the proportion of ammonia should be adjusted in accordance with the proportions of the specific butenes present. For example, for alkylating with a mixture containing approximately equal proportions of butene-1, butene-2, and isobutene, the proportion of ammonia should preferably be adjusted to approximately 3.2 mole per cent of the hydrogen fluoride. It will be understood that adjusting the proportion of ammonia in this manner is in the interest of obtaining the optimum octane rating for the over-all alkylate produced and that other basic nitrogen compounds may be used in place of ammonia in equivalent amount. However, ammonia is preferred as being most economical.

This invention is equally applicable to the hydrofluoric acid alkylation of other isoparaffins, such as isopentane, etc., with normal olefins in general. Thus, such limitations of concentrations of the basic nitrogen compound which depend upon the structure of the normal olefin such as butene-1 and butene-2 will also apply in general to other 1-olefins and 2-olefins.

Although the action of the basic nitrogen compound is not completely understood at present, it appears to be associated, as was indicated in my aforementioned copending application, Serial No. 550,447, with the strong coordination tendency of the nitrogen atom in ammonia or similar compounds to form an ammonium ion by union with a proton or other actual or virtual positive ion. Because of this tendency of the nitrogen compound, the formation of actual or virtual ions from isoparaffins in the presence of hydrogen fluoride appears to be promoted by shifting to the right of such equilibria as the following:

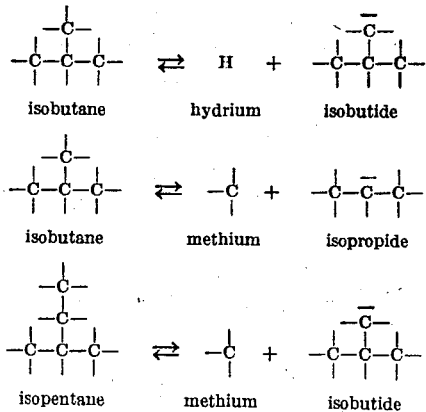

In this mechanism, the basic nitrogen compound, such as ammonia, quinoline, etc., promotes the ionization of the paraffins by acting as a hydrium or methium acceptor. As the result, the proportion of certain high-octane-number octanes, such as 2,2,4-trimethylpentane, produced for example in the alkylation of isobutane with normal butenes is markedly increased, with resultant improvement in the quality of the alkylate. (For convenience, the hydrogen atoms have not been written, except for that forming a proton, which has been designated as hydrium in line with the terminology of designating positive and negative "ions" by the terminations ium and ide, respectively. Dashes perpendicular to an atom represent bonds or shared pairs of electrons between two carbons atoms or between a carbon atom and a hydrogen atom; dashes parallel to an atom represent unshared or "lone" pairs of electrons.) For further details of this explanation, which is theoretical in nature, the aforementioned copending application may be consulted.

A detailed description of one embodiment of this invention may be made with reference to the accompanying drawing, which is a schematic flow-diagram exemplifying a preferred manner of converting four-carbon paraffins to motor-fuel paraffins.

An anhydrous mixture of isobutane and normal butane entering the system through inlet 1 is separated into its components by fractionator 2. The isobutane is passed through conduits 3 and 4 to alkylators 5 and 6, which preferably are so designed that the incoming isobutane sweeps any corrosive mixture away from any bearing box or packing gland. The normal butane is passed through conduit 7 to dehydrogenator 8, in which it is catalytically dehydrogenated to normal butenes. The resulting dehydrogenation effluent is passed through conduit 9 to fractionator 10, which comprises a system of fractional-distillation columns. From this system, butene-1 is passed through conduit 11 to the isobutane stream in conduit 3; undehydrogenated normal butane is recycled through conduit 12 to dehydrogenator 8; butene-2 is passed through conduit 13 to the isobutane stream in conduit 4; and by-products of the dehydrogenation are removed, mostly as a low-boiling fraction, in a manner (not shown) obvious to those skilled in the art.

In each of alkylators 5 and 6, the incoming mixture of isobutane and normal butene is intimately mixed under alkylation conditions with an alkylation catalyst, which enters the alkylator from conduit 14 or 15, respectively. For alkylator 5, in which the alkylating butene is butene-1, the catalyst is concentrated or substantially anhydrous hydrofluoric acid containing approximately 5.5 mole per cent of ammonia; for alkylator 6, in which the alkylating butene is butene-2, the catalyst is concentrated or substantially anhydrous hydrofluoric acid containing approximately 3.5 mole per cent of ammonia. Execpt for the difference in ammonia content of the hydrofluoric acid, the alkylation conditions in the two alkylators may be substantially alike. Preferably, the pressure should be sufficient to maintain the reaction mixture in liquid phase, but above this point it may be as high as may be desired for such purposes as effecting proper movement of the various streams in the system or the like. The temperature and the contact time, or average time of residence or mixing in the alkylator, may vary widely; for a temperature in the range of about 90 to about 120° F., which is preferred as being readily obtainable by water-cooling, the contact time may be from about 3 to about 20 minutes, preferably approximately 10 minutes. The volume ratio of hydrocarbons to hydrofluoric acid in the alkylator may be from about 1:1 to about 4:1, preferably approximately 1:1. The mole ratio of isobutane to butene in the incoming hydrocarbon stream is preferably as high as is economically feasible, usually it is from 4:1 to 10:1, and a much higher ratio in the reaction zone itself.

The reaction mixture effluent from alkylator 5 is passed through conduit 16 to separator 17, in which it is separated by gravity into two liquid phases, one a hydrocarbon phase and the other a heavier hydrogen fluoride phase. The hydrocarbon phase may be passed through conduits 18, 20 and 34 to fractionator 19 for separation into various fractions, but it is preferably passed directly through conduit 18 to extractor 21 for removal of organic fluorine compounds by extraction with substantially ammonia-free anhydrous hydrofluoric acid, which is introduced through conduit 22, in a manner similar to that indicated in the aforementioned Patent No. 2,320,629. The hydrofluoric acid phase from separator 17 in part is recycled through conduit 14 to alkylator 5 and in part is passed through conduit 24 to fractionator 25. From fractionator 25, substantially ammonia-free hydrofluoric acid, accompanied by some light hydrocarbons, is passed overhead through conduit 22 to extractor 21; and a kettle product from fractionator 25, substantially free from free hydrofluoric acid, is passed through conduit 50 to separator 51, in which it is separated into ammonium fluoride and a tar or oil. The tar or oil is withdrawn from the process, as through outlet 29, and may be treated to recover any entrained ammonium fluoride and/or any other fluorine compounds (not shown). The ammonium fluoride, preferably after addition of sufficient anhydrous hydrofluoric acid to it to dissolve it (not shown) is ordinarily passed in part directly through conduits 26 and 14 to alkylator 5 and in part through conduits 26, 27, and 15 to alkylator 6, but part or all of it may be withdrawn, if desired, through outlet 28. Make-up anhydrous hydrofluoric acid may be added to the system as required through inlet 30, and make-up ammonia is added as required through inlet 31, preferably as ammonium fluoride or bifluoride and most preferably as a solutiton in substantially anhydrous hydrofluoric acid.

The reaction mixture effluent from alkylator 6 is passed through conduit 32 to separator 33, in which it is separated by gravity into two liquid phases, one a hydrocarbon phase and the other a heavier hydrogen fluoride phase. The hydrocarbon phase may be passed through conduits 35 and 34 to fractionator 19, for separation into various fractions, but it is preferably passed directly through conduit 35 to extractor 21 for removal of organic fluorine compounds by extraction with hydrofluoric acid; inasmuch as this hydrocarbon phase at times contains slightly less organic fluorine than the hydrocarbon phase from separator 25, it is preferably introduced into extractor 21 at a point correspondingly relatively upstream with respect to the stream of extracting acid. The hydrofluoric acid phase from separator 33 in part is recycled through conduit 15 to alkylator 6 and in part may be withdrawn through conduit 37 and outlet 38 or, preferably, is passed through conduit 37 directly to fractionator 25 for purification. Make-up anhydrous hydrofluoric acid may be added to the system through inlet 39, but it is preferably added entirely through inlet 40 and line 22 to extractor 21; make-up ammonia, when required, may be added to the system through inlet 41, but ordinarily sufficient ammonia is brought as ammonium fluoride and/or bifluoride through conduit 27.

From extractor 21 the hydrofluoric acid extract is passed through conduits 42 and 15 to alkylator 6, carrying with it the extracted organic fluorine compounds, which thus become available for the alkylation in alkylator 6 with advantageous recovery of the organic fluorine as hydrogen fluoride.

From extractor 21 the organic fluorine-depleted hydrocarbon mixture is passed through conduits 43, 20 and 34 to fractionator 19, which generally is a system of fractional-distillation columns. From this system hydrofluoric acid dissolved in the hydrocarbon mixture is distilled overhead together with some isobutane and is passed through conduits 44, 42 and 15 to alkylator 6. Isobutane is recycled to alkylators 5 and 6 through conduits 45 and 46, as shown. Normal butane is withdrawn through outlet 47, or is passed to dehydrogenator 8 by means not shown. A motor fuel of high octane rating is withdrawn as the principal product of the process through outlet 48. A small fraction of heavy hydrocarbons may be withdrawn through outlet 49.

It will be understood that the flow-diagram is schematic and that auxiliary equipment, not shown or described, such as pumps, valves, controllers, and the like, may be desirable or even necessary at various points in the process. As such auxiliary equipment are well known, they can be readily supplied by those skilled in the art.

The following data are illustrative of some of the many aspects of the invention, without being necessarily limitative.

Two continuous pilot-plant runs were made for the alkylation of isobutane with butene-1 under similar alkylation conditions except that in one run the anhydrous hydrofluoric acid contained about 5 mole per cent of ammonia, introduced as ammonium bifluoride whereas in the other run the acid was ammonia-free. The data obtained may be summarized as follows:

| Run | With 5.3% NH₃ | Without NH₃ |
|---|---|---|
| Temperature, °F | 91 | 88 |
| Pressure, p. s. i. | 130 | 130 |
| Contact time, min | 10.4 | 11.1 |
| Isobutane/butene (mol) | 4.7 | 4.7 |
| Hydrocarbons/HF (vol.) | 1.13 | 1.15 |
| Total debutanized alkylate: | | |
|   Yield, wt. per cent of butene | 203 | 192 |
|   Gravity, ° A. P. I. | 67.9 | 67.8 |
|   Reid vapor pressure, lb | | 2.75 |
|   A. S. T. M. distillation, °F.— | | |
|     First drop | 127 | 162 |
|     10% evap | 193 | 203 |
|     50% evap | 226 | 227 |
|     90% evap | 317 | 293 |
|     End point | 412 | 463 |
|   A. S. T. M. octane number | 89.2 | 85.3 |
|   Composition, vol. per cent— | | |
|     Pentanes | 4.5 | 3.9 |
|     Hexanes | 6.7 | 3.0 |
|     Heptanes | 6.9 | 3.9 |
|     Octanes | 65.9 | 73.4 |
|     Nonanes | 2.3 | 1.4 |
|     Decanes | 4.1 | 2.6 |
|     Heavier | 9.6 | 11.8 |
| Light alkylate: | | |
|   Cut point, °F | 365 | 365 |
|   Yield, vol. per cent of total alkylate | 93.7 | 92.5 |
|   Gravity, ° A. P. I. | 68.6 | 69.0 |
|   Reid vapor pressure, lb | | 2.80 |
|   A. S. T. M. distillation, °F.— | | |
|     First drop | 158 | 151 |
|     10% evap | 197 | 204 |
|     50% evap | 223 | 224 |
|     90% evap | 254 | 250 |
|     End point | 365 | 368 |
|   A. S. T. M. octane number | 89.4 | 87.4 |

It will be noted that the octane number of the total alkylate was increased by 3.9 units because of the presence of the ammonia in the hydrofluoric acid, and that the octane number of the light or aviation-range alkylate was increased by 2.0 units. Furthermore, it will be noted that the light alkylate constituted 93.7 per cent by volume of the total alkylate when ammonia was present, whereas it was only 92.5 per cent when ammonia was absent; inasmuch as the yield of total alkylate was 203 and 192 mole per cent of the original butene-1, respectively, this fact indicates that an advantageously higher yield of light alkylate is obtained from the olefin when ammonia is present. Also, it will be noted that, in spite of a shorter contact time, the total alkylate contained relatively more light paraffins and relatively less heavy paraffins when ammonia was present, reflecting the apparent effect of ammonia on the ionization of paraffins visualized hereinbefore.

It may be pointed out that in both these runs the mole ratio of isobutane to butene-1 in the feed was fairly low, 4.7:1. There are a number of factors that at present make it desirable to conduct commercial alkylation at such a fairly low value for this ratio, even though it causes the yield and the quality of the alkylate to be somewhat adversely affected. When as at present, the need for high-quality alkylate is great, the available alkylation equipment is quite limited, and the amount of isobutane is insufficient for all needs, it is desirable to conduct the alkylation at a fairly low mole ratio of isobutane to olefin, in the interest of obtaining as much alkylate as possible from the aavilable isobutane with the available equipment. Also, for a given output of alkylate, the concomitant undesirable isomerization of isobutane to normal butane that occurs during alkylation is decreased by decrease in the ratio of isobutane to olefin, so that the over-all consumption of isobutane is decreased. In line with these considerations, it may be observed that the yield and the quality of the alkylate obtained in the run made without ammonia reflect the influence of the ratio of isobutane to butene-1, for at a mole ratio twice as large the yield of light alkylate is approximately 98 per cent by volume of the total alkylate and the octane number is approximately 89. But in the run made with ammonia, the yield and the octane number of the alkylate approach the relatively higher values that are obtained in hydrofluoric acid alkylation of isobutane with butene-2 without ammonia at a mole ratio of isobutane to olefin approximately twice that used in the present run. In other words, this run illustrates the unexpected but important advantage of overcoming to a considerable degree the unfavorable influence attending a low value for the ratio of isobutane to olefin in the feed.

Inasmuch as this invention may be practiced otherwise than as specifically described or illustrated, and inasmuch as many variations and modifications of it will be obvious to those skilled in the art, this invention should not be restricted otherwise than by the disclosure and accompanying drawing.

Having described my invention, I claim:

1. The process for the alkylation of isobutane with butenes in the presence of a hydrofluoric acid alkylation catalyst which comprises passing a butene fraction to a fractional distillation, separating said butene fraction into a fraction comprising butene-1 as an essential olefin constituent and a fraction comprising butene-2 as an essential olefin constituent, introducing said butene-1 fraction together with isobutane and a hydrofluoric acid alkylation catalyst containing about 4.5 to about 6.5 mole per cent of ammonia into an alkylation zone, maintaining the contents of said alkylation zone under alkylation conditions, separating effluents of said alkylation zone into a liquid hydrocarbon phase and a liquid hydrofluoric acid phase, passing said hydrocarbon phase to a fractional distillation and recovering a hydrocarbon fraction comprising higher-boiling hydrocarbons produced by said alkylation as a product of the process, passing at least a portion of said hydrofluoric acid phase to a fractional distillation to recover as a low-boiling fraction purified hydrofluoric acid and as a high-boiling fraction a mixture comprising ammonium fluoride together with tar and oil as impurities, separating said ammonium fluoride from said tar and oil, and passing a portion of said ammonium fluoride back to said butene-1 alkylation zone, separately introducing said butene-2 fraction together with isobutane and a hydrofluoric acid alkylation catalyst containing about 2.5 to about 4.5 mole per cent of ammonia into an alkylation zone, maintaining the contents of said alkylation zone under alkylation conditions, separating effluents of said alkylation zone into a liquid hydrocarbon phase and a liquid hydrofluoric acid phase, passing said hydrocarbon phase to the aforesaid hydrocarbon phase fractional distillation, passing at least a portion of said hydrofluoric acid phase to the aforesaid fractional distillation for the separation of ammonium fluoride from hydrofluoric acid, and passing a portion of said ammonium fluoride after the aforesaid separation of tar and oil therefrom to said butene-2 alkylation zone.

2. A process for alkylating isobutane with a mixture of normal butenes comprising substantially equal proportions of butene-1 and butene-2 in the presence of concentrated hydrofluoric acid as a catalyst, which comprises reacting said isobutane with said normal butenes under alkylation conditions and in the presence of a hydrofluoric acid alkylation catalyst containing approximately 4.5 mole per cent of ammonia, and recovering from an effluent of said alkylation paraffin hydrocarbons of high octane number as a product of the process.

3. A process for alkylating isobutane with a mixture of butenes comprising substantially equal proportions of isobutene, butene-1, and butene-2 in the presence of concentrated hydrofluoric acid as a catalyst, which comprises reacting said isobutane with said butenes under alkylation conditions and in the presence of a hydrofluoric acid catalyst containing approximately 3.2 mole per cent of ammonia, and recovering from an effluent of said alkylation paraffin hydrocarbons of high octane number as a product of the process.

4. A process for alkylating isobutane with a mixture of normal butenes in the presence of concentrated hydrofluoric acid as a catalyst, which comprises reacting said isobutane with said normal butenes under alkylation conditions and in the presence of a hydrofluoric acid alkylation catalyst containing approximately 4.5 mole per cent of ammonia, and recovering from an effluent of said alkylation paraffin hydrocarbons of high octane number as a product of the process.

5. In a process for reacting isobutane with normal butenes in the presence of concentrated hydrofluoric acid as the alkylation catalyst to produce paraffin hydrocarbons having high octane numbers, the improvement which comprises separating a mixture of normal butenes into a fraction comprising butene-1 as the essential olefin constituent and a fraction comprising butene-2 as the essential olefin constituent, reacting said butene-1 fraction with isobutane under alkylation conditions and in the presence of a hydrofluoric acid alkylation catalyst containing about 4.5 to about 6.5 mole per cent of a basic nitrogen compound, separately reacting said butene-2 fraction with isobutane under alkylation conditions and in the presence of a hydrofluoric acid alkylation catalyst containing about 2.5 to about 4.5 mole per cent of a basic nitrogen compound, combining at least a portion of the effluents of each said alkylation and recovering from the combined effluents paraffin hydrocarbons of high octane number as a product of the process.

6. The process of claim 5 in which said basic nitrogen compound is ammonia.

7. The process of claim 5 in which said basic nitrogen compound is quinoline.

8. The process of claim 5 in which said basic nitrogen compound is an acid amide.

9. The process of claim 5 in which said nitrogen compound is acetamide.

10. The process of claim 5 in which said nitrogen compound is ammonia and is added as ammonium bifluoride.

11. In a process for reacting a low-boiling isoparaffin with normal butenes in the presence of concentrated hydrofluoric acid as the alkylation catalyst to produce paraffin hydrocarbons having high octane numbers, the improvement which comprises separating a mixture of normal butenes into a fraction comprising butene-1 as the essential olefin constituent and a fraction comprising butene-2 as the essential olefin constituent, reacting said butene-1 fraction with a low-boiling isoparaffin under alkylation conditions and in the presence of a hydrofluoric acid alkylation catalyst containing about 4.5 to about 6.5 mole per cent of a basic nitrogen compound, separately reacting said butene-2 fraction with a low-boiling isoparaffin under alkylation conditions and in the presence of a hydrofluoric acid alkylation catalyst containing about 2.5 to about 4.5 mole per cent of a basic nitrogen compound, combining at least a portion of the effluents of each said alkylation and recovering from the combined effluents paraffin hydrocarbons of high octane number as a product of the process.

12. An improved process for reacting a low-boiling isoparaffin with low-boiling normal olefins in the presence of concentrated hydrofluoric acid as the alkylation catalyst to produce paraffin hydrocarbons having high octane numbers, which comprises separating a mixture of low-boiling olefins into a fraction comprising 1-olefins as the essential olefin constituent and a fraction comprising 2-olefins as the essential olefin constituent, reacting said 1-olefin fraction with a low-boiling isoparaffin under alkylation conditions and in the presence of a hydrofluoric acid aklylation catalyst containing about 4.5 to about 6.5 mole per cent of a basic nitrogen compound, separately reacting said 2-olefin fraction with a low-boiling isoparaffin under alkylation conditions and in the presence of a hydrofluoric acid alkylation catalyst containing about 2.5 to about 4.5 mole per cent of a basic nitrogen compound, combining at least a portion of the effluents of each said alkylation and recovering from the combined effluents paraffin hydrocarbons of high octane number as a product of the process.

13. An improved process for reacting a low-boiling isoparaffin with low-boiling normal olefins in the presence of a hydrofluoric acid-containing catalyst as the alkylation catalyst to produce paraffin hydrocarbons having high octane numbers, which comprises separating a mixture of low-boiling olefins into a fraction comprising 1-olefin as the essential olefin constituent and a fraction comprising 2-olefins as the essential olefin constituent, reacting said 1-olefin fraction with a low-boiling isoparaffin under alkylating conditions and in the presence of a hydrofluoric acid-containing catalyst containing a basic nitrogen compound content within the range of about 4.5 to about 6.5 mole per cent of the hydrogen fluoride present, separately reacting said 2-olefin fraction with a low-boiling isoparaffin under alkylation conditions and in the presence of a hydrofluoric acid-containing catalyst containing a basic notrogen compound content within the range of about 2.5 to about 4.5 mole per cent of the hydrogen fluoride present, combining at least a portion of the effluents of each said alkylation and recovering from the combined effluents paraffin hydrocarbons of high octane number as a product of the process.

14. In a process for the alkylation of isobutane with butenes comprising normal butenes in the presence of a hydrofluoric acid-containing catalyst, the improvement which comprises maintaining in said hydrofluoric acid-containing catalyst a content of a basic nitrogen compound in mole per cent of hydrogen fluoride present within a range, the approximate lower limit of which is determined by 4.5 times the mole fraction of butene-1 of the total of said butenes plus 2.5 times the mole fraction of butene-2 of the total of said butenes and the approximate upper limit of which is determined by 6.5 times mole fraction of butene-1 of the total of said butenes plus 4.5 times the mole fraction of butene-2 of the total of said butenes.

15. In a process for the alkylation of isobutane with butene-1 in the presence of a hydrofluoric acid-containing catalyst, the improvement which comprises maintaining in said hydrofluoric acid-containing catalyst a content of a basic nitrogen compound within the range of about 4.5 to about 6.5 mole per cent of the hydrogen fluoride present.

16. In a process for the alkylation of isobutane with butene-2 in the presence of a hydrofluoric acid-containing catalyst, the improvement which comprises maintaining in said hydrofluoric acid-containing catalyst a content of a basic nitrogen compound within the range of about 2.5 to about 4.5 mole per cent of hydrogen fluoride present.

17. In a process for the alkylation of a low-boiling isoparaffin with low-boiling olefins comprising normal olefins in the presence of a hydrofluoric acid-containing catalyst as the alkylation catalyst, the improvement which comprises maintaining in said hydrofluoric acid-containing catalyst a content of a basic nitrogen compound in mole per cent of hydrogen fluoride present within a range, the approximate lower limit of which range is determined by 4.5 times the mole fraction of 1-olefin of the total of said olefins plus 2.5 times the mole fraction of 2-olefin of the total of said olefins and the approximate upper limit of which range is determined by 6.5 times the mole fraction of 1-olefin of the total of said olefins plus 4.5 times the mole fraction of 2-olefin of the total of said olefins.

18. The process of claim 5 in which said nitrogen compound is ammonia and is added as an ammonium fluoride.

MARYAN P. MATUSZAK.

REFERENCES CITED

The following references are of record in the file of this patent:

UNITED STATES PATENTS

| Number | Name | Date |
|---|---|---|
| 2,276,251 | Morrell | Mar. 10, 1942 |
| 2,317,694 | Ott | Apr. 27, 1943 |
| 2,322,800 | Frey | June 29, 1943 |
| 2,320,629 | Matuszak | June 1, 1943 |